US009693060B2

(12) United States Patent
Seregin et al.

(10) Patent No.: US 9,693,060 B2
(45) Date of Patent: Jun. 27, 2017

(54) DEVICE AND METHOD FOR SCALABLE CODING OF VIDEO INFORMATION

(71) Applicant: QUALCOMM Incorporated, San Diego, CA (US)

(72) Inventors: Vadim Seregin, San Diego, CA (US); Jianle Chen, San Diego, CA (US); Marta Karczewicz, San Diego, CA (US); Liwei Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 781 days.

(21) Appl. No.: 14/078,242

(22) Filed: Nov. 12, 2013

(65) Prior Publication Data

US 2014/0140405 A1 May 22, 2014

Related U.S. Application Data

(60) Provisional application No. 61/727,644, filed on Nov. 16, 2012, provisional application No. 61/732,880,
(Continued)

(51) Int. Cl.
*H04N 19/30* (2014.01)
*H04N 19/109* (2014.01)
(Continued)

(52) U.S. Cl.
CPC ......... *H04N 19/109* (2014.11); *H04N 19/176* (2014.11); *H04N 19/20* (2014.11);
(Continued)

(58) Field of Classification Search
CPC ....... H04N 19/109; H04N 19/30; H04N 19/51
(Continued)

(56) References Cited

U.S. PATENT DOCUMENTS 7,224,732 B2  5/2007  Takahashi et al.
7,899,115 B2  3/2011  Jeon et al.
(Continued)

OTHER PUBLICATIONS

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); < URL: http://wftp3.itu.int/av-arch/jctvc-site/no.jvtcv-k0036 >, Oct. 2, 2012 (Oct. 2, 2012), XP030112968, pp. 1-22.
(Continued)

*Primary Examiner* — William C Vaughn, Jr.
*Assistant Examiner* — Jerry Jean Baptiste
(74) *Attorney, Agent, or Firm* — Knobbe, Martens, Olson & Bear, LLP

(57) ABSTRACT

An apparatus configured to code video information includes a memory unit and a processor in communication with the memory unit. The memory unit is configured to store video information associated with a base layer and an enhancement layer. The video information comprises at least one enhancement layer (EL) block and at least one co-located base layer (BL) block. The co-located BL block has motion information associated therewith. The processor is configured to, in response to determining that the size of the EL block is smaller than a threshold size, either (1) use less than all of the motion information associated with the co-located BL block to code the EL block, or (2) refrain from using any motion information associated with the co-located BL block to code the EL block. The processor may encode or decode the video information.

20 Claims, 12 Drawing Sheets

Related U.S. Application Data filed on Dec. 3, 2012, provisional application No. 61/734,920, filed on Dec. 7, 2012, provisional application No. 61/749,077, filed on Jan. 4, 2013.

(51) Int. Cl.
*H04N 19/176* (2014.01)
*H04N 19/51* (2014.01)
*H04N 19/20* (2014.01)
*H04N 19/577* (2014.01)

(52) U.S. Cl.
CPC .............. *H04N 19/30* (2014.11); *H04N 19/51* (2014.11); *H04N 19/577* (2014.11)

(58) Field of Classification Search
USPC ......................................................... 375/240
See application file for complete search history.

(56) References Cited

U.S. PATENT DOCUMENTS

| | | | |
|---|---|---|---|
| 2005/0047436 A1* | 3/2005 | Ohata | H04N 21/23602 370/466 |
| 2005/0226334 A1 | 10/2005 | Han | |
| 2008/0095238 A1 | 4/2008 | Wu et al. | |
| 2009/0110075 A1* | 4/2009 | Chen | H04N 19/51 375/240.16 |
| 2009/0238279 A1* | 9/2009 | Tu | H04N 19/30 375/240.16 |
| 2010/0220790 A1* | 9/2010 | Jeon | H04N 19/55 375/240.16 |
| 2013/0188719 A1 | 7/2013 | Chen et al. | |

OTHER PUBLICATIONS

Deng Z., et al., "Non-TE C5: Inter-layer motion data inheritance", 103. MPEG Meeting; Jan. 21, 2013-Jan. 25, 2013; Geneva; (Motion Picture Expert Group or ISO/IEC JTC1/SC29/W11), No. m27633, Jan. 15, 2013 (Jan. 15, 2013), pp. 1-5, XP030056198.

Deng Z., et al., "Non-TE C5: Inter-layer motion data inheritance", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.1tu.int/av-arch/jctvc-site/,, No. JCTVC-L0291, Jan. 8, 2013 (Jan. 8, 2013), pp. 1-5, XP030113779.

Gisquet C., et al., "Non-TE5.3: Inter-layer inferred prediction mode and motion compensation restrictions in SHVC", 12. JCT-VC Meeting; 103. MPEG Meeting; Jan. 14, 201-Jan. 23, 2013; Geneva; (Joint Collaborative Team on Video Coding of ISO/IEC JTC1/SC29/WG11 and ITU-T SG.16); URL: http:// wftp3.1tu.int/av-arch/jctvc-site/, No. JCTVC-L0103, Jan. 7, 2013 (Jan. 7, 2013), pp. 1-5, XP030113591.

International Search Report and Written Opinion—PCT/US2013/069914—ISA/EPO—Feb. 6, 2014.

Kondo K.et al., "AHG7: Level definition to limit memory bandwidth of MC", 9. JCT-VC Meeting; 100. MPEG Meeting; Apr. 27, 2012-May 7, 2012; Geneva; (Joint Collaborative Team on Video Oding of ISO/IEC JTC1/SC29/WG11 and ITU-TSG.16); URL: http://wftp3.1tu.int/av-arch/jctvc-site/, No. JCTVC-101 06, Apr. 16, 2012 (Apr. 16, 2012), pp. 1-6, XP030111869.

\* cited by examiner

DEVICE AND METHOD FOR SCALABLE CODING OF VIDEO INFORMATION

CROSS-REFERENCE TO RELATED APPLICATIONS

This application claims priority to U.S. Provisional No. 61/727,644, filed Nov. 16, 2012, U.S. Provisional No. 61/732,880, filed Dec. 3, 2012, U.S. Provisional No. 61/734,920, filed Dec. 7, 2012, and U.S. Provisional No. 61/749,077, filed Jan. 4, 2013, all of which are hereby incorporated by reference in their entireties.

TECHNICAL FIELD

This disclosure relates to the field of video coding and compression, particularly to scalable video coding (SVC) or multiview video coding (MVC, 3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. For SVC, the base layer can carry video data with a base level of quality. The one or more enhancement layers can carry additional video data to support higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, a current block in the enhancement layer or another view may be predicted using a corresponding block (e.g., co-located block) in the base layer or view. In one embodiment, the motion information (e.g., motion vectors) of the current block may be coded using the motion information associated with the corresponding block in the base layer. In such cases, the coder can directly inherit the motion information of the EL block from the corresponding BL block, rather than determining the motion information of the EL block from scratch.

However, in some situations, directly copying the motion information from the corresponding BL block for each of the EL blocks may reduce the overall coding performance. For example, if the EL blocks are very small (e.g., 4×4), having to derive the motion information for each of such EL blocks from the corresponding BL blocks may require high memory bandwidth and cause the coding performance to be limited by the memory access speed. Thus, in such situations, the coding efficiency and performance may be improved by only using a portion of the motion information of the corresponding BL blocks or by refraining from using the motion information of the corresponding BL blocks for coding certain EL block sizes. By doing so, the techniques described in this disclosure may reduce computational complexity, improve coding efficiency and/or overall coding performance associated with a method of coding video information.

The systems, methods and devices of this disclosure each have several innovative aspects, no single one of which is solely responsible for the desirable attributes disclosed herein.

In one embodiment, an apparatus configured to code (e.g., encode or decode) video information includes a memory unit and a processor in communication with the memory unit. The memory unit is configured to store video information associated with a base layer and an enhancement layer. The video information comprises at least one enhancement layer (EL) block and at least one co-located base layer (BL) block. The co-located BL block has motion information associated therewith. The processor is configured to, in response to determining that the size of the EL block is smaller than a threshold size, either (1) use less than all of the motion information associated with the co-located BL block to code the EL block, or (2) refrain from using any motion information associated with the co-located BL block to code the EL block. In one embodiment, the threshold size is 8×8. In one embodiment, the processor is configured to perform the step (1) for some EL block sizes and perform the step (2) for other, different EL block sizes. In one embodiment, the motion information associated with the co-located BL block comprises bi-directional motion vectors, and the processor performs the step (1) by converting the bi-directional motion vectors to one or more uni-directional motion vectors that refer to reference pictures from only one of reference picture list 0 and reference picture list 1. In one embodiment, the processor is configured to perform the step (2) by refraining from signaling a mode flag that indicates whether any motion information associated with the co-located BL block is to be used for coding the EL block. In one embodiment, the motion information associated with the co-located BL block comprises one or more of a motion vector, a prediction direction, and a reference index. In one embodiment, the processor is further configured to perform motion compensation to code the EL block using said less than all of the motion information associated with the co-located BL block. In one embodiment, the processor is further configured to determine a partition type of a coding unit (CU) in the enhancement layer based on the motion information of a plurality of EL blocks within the CU. In one embodiment, the processor is configured to code the EL block based on one or more blocks of a neighboring coding unit (CU) or a neighboring prediction unit (PU), wherein the one or more blocks are located adjacent to the EL block.

In another embodiment, a method of coding (e.g., encoding or decoding) video information includes storing video information associated with a base layer and an enhancement layer. The video information comprises at least one enhancement layer (EL) block and at least one co-located base layer (BL) block. The co-located BL block has motion information associated therewith. The method of coding (e.g., encoding or decoding) video information further comprises determining that the size of the EL block is smaller than a threshold size; and either (1) using less than all of the motion information associated with the co-located BL block to code the EL block, or (2) refraining from using any motion information associated with the co-located BL block to code the EL block. In one embodiment, the threshold size is 8×8. In one embodiment, the step (1) is performed for some EL block sizes and the step (2) is performed for other, different EL block sizes. In one embodiment, the motion information associated with the co-located BL block comprises bi-directional motion vectors, and the step (1) is performed by converting the bi-directional motion vectors to one or more uni-directional motion vectors that refer to reference pictures from only one of reference picture list 0 and reference picture list 1. In one embodiment, the step (2) is performed by refraining from signaling a mode flag that indicates whether any motion information associated with the co-located BL block is to be used for coding the EL block.

In another embodiment, a non-transitory computer readable medium includes code that, when executed, causes an apparatus to store video information associated with a base layer and an enhancement layer. The video information comprises at least one enhancement layer (EL) block and at least one co-located base layer (BL) block. The co-located BL block has motion information associated therewith. The code further causes the apparatus to determine that the size of the EL block is smaller than a threshold size; and either (1) use less than all of the motion information associated with the co-located BL block to code the EL block, or (2) refrain from using any motion information associated with the co-located BL block to code the EL block. In one embodiment, the step (1) is performed for some EL block sizes and the step (2) is performed for other, different EL block sizes. In one embodiment, the motion information associated with the co-located BL block comprises bi-directional motion vectors, and the step (1) is performed by converting the bi-directional motion vectors to one or more uni-directional motion vectors that refer to reference pictures from only one of reference picture list 0 and reference picture list 1. In one embodiment, the step (2) is performed by refraining from signaling a mode flag that indicates whether any motion information associated with the co-located BL block is to be used for coding the EL block.

In another embodiment, a video coding device configured to code (e.g., encode or decode) video information includes means for storing video information associated with a base layer and an enhancement layer. The video information comprises at least one enhancement layer (EL) block and at least one co-located base layer (BL) block. The co-located BL block has motion information associated therewith. The video coding device further includes: means for determining that the size of the EL block is smaller than a threshold size; and means for either (1) using less than all of the motion information associated with the co-located BL block to code the EL block, or (2) refraining from using any motion information associated with the co-located BL block to code the EL block. In one embodiment, the step (1) is performed for some EL block sizes and the step (2) is performed for other, different EL block sizes. In one embodiment, the motion information associated with the co-located BL block comprises bi-directional motion vectors, and the step (1) is performed by converting the bi-directional motion vectors to one or more uni-directional motion vectors that refer to reference pictures from only one of reference picture list 0 and reference picture list 1. In one embodiment, the step (2) is performed by refraining from signaling a mode flag that indicates whether any motion information associated with the co-located BL block is to be used for coding the EL block.

DETAILED DESCRIPTION

Figure 1:
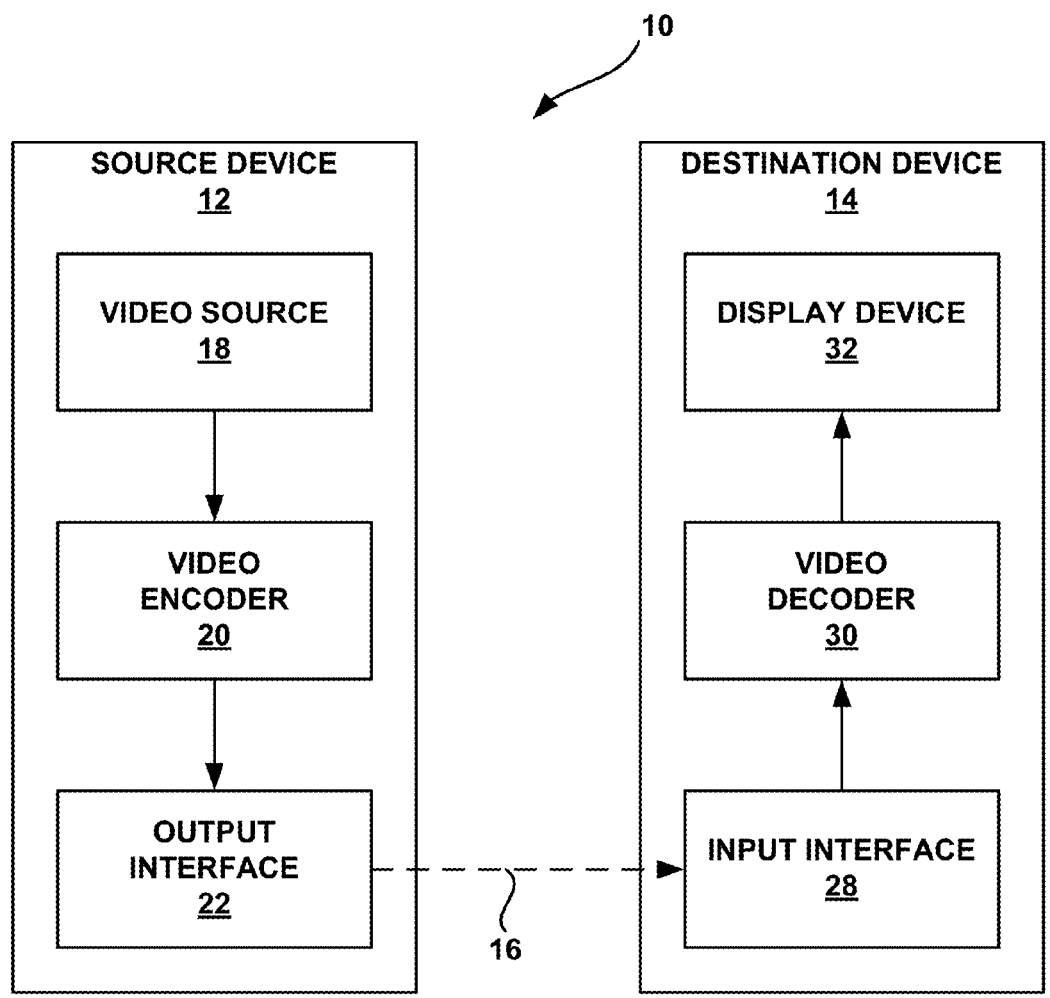
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, i.e., Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, IS O/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, all of which are incorporated by reference in their entireties.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.it-sudparis.eu/jct/doc_end_user/documents/12_Geneva/wg11/JCTVC-L1003-v34.zip, as of Oct. 15, 2013, which is incorporated by reference in its entirety. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2:
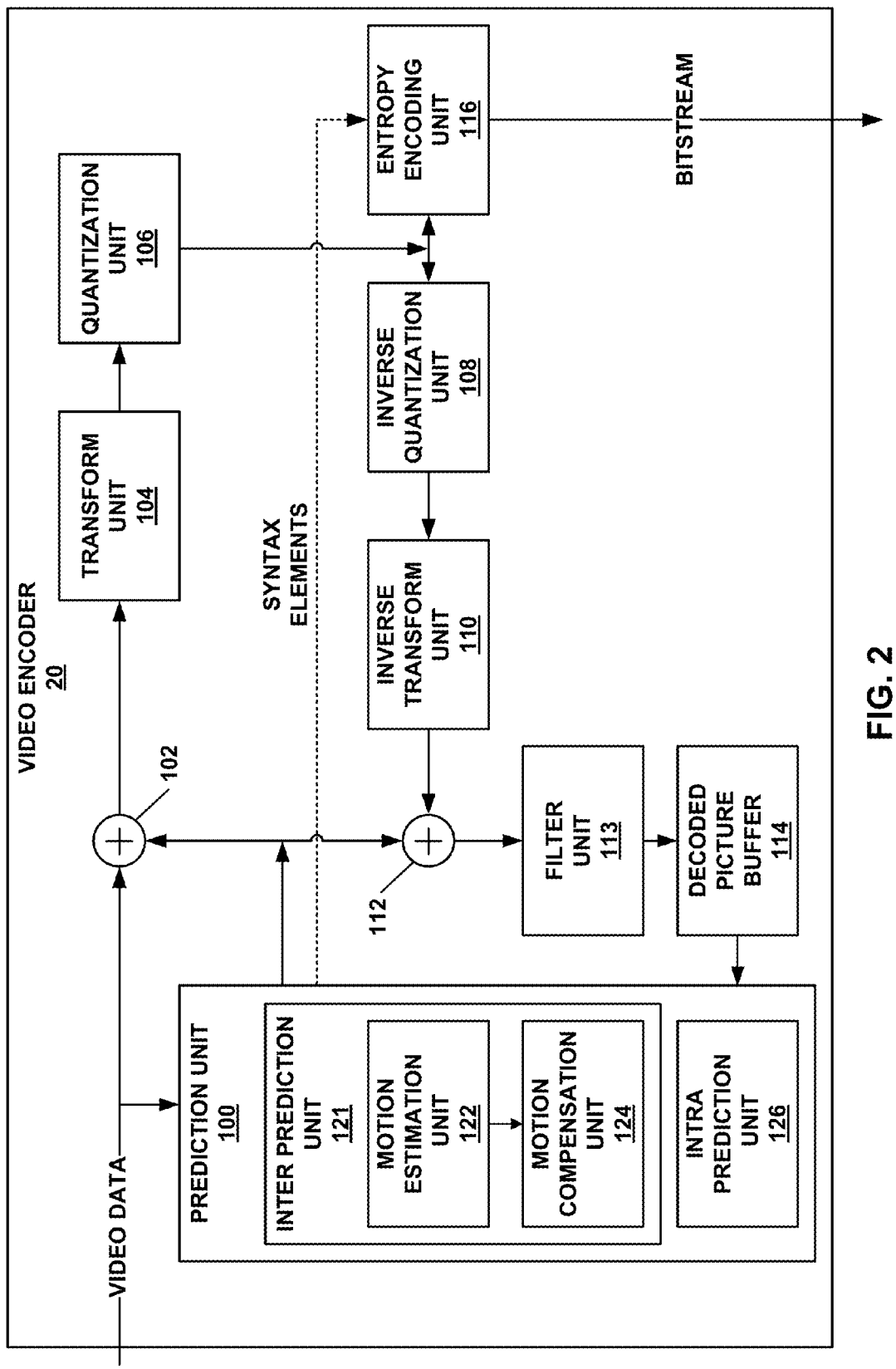
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, prediction unit 100 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, video encoder 20 includes a plurality of functional components. The functional components of video encoder 20 include a prediction unit 100, a residual generation unit 102, a transform unit 104, a quantization unit 106, an inverse quantization unit 108, an inverse transform unit 110, a reconstruction unit 112, a filter unit 113, a decoded picture buffer 114, and an entropy encoding unit 116. Prediction unit 100 includes an inter prediction unit 121, motion estimation unit 122, a motion compensation unit 124, and an intra prediction unit 126. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction unit 100 may perform quadtree partitioning on the video block of the treeblock to divide the video block into progressively smaller video blocks. Each of the smaller video blocks may be associated with a different CU. For example, prediction unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction unit 100 may generate a hierarchical quadtree data structure for the treeblock. For example, a treeblock may correspond to a root node of the quadtree data structure. If prediction unit 100 partitions the video block of the treeblock into four sub-blocks, the root node has four child nodes in the quadtree data structure. Each of the child nodes corresponds to a CU associated with one of the sub-blocks. If prediction unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIGS. 9-12, the prediction unit 100 may be configured to code (e.g., encode or decode) the PU (or any other EL blocks or video units) by performing the steps illustrated in FIGS. 9-12.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction unit 100 may select the prediction data for a PU from among the prediction data generated by motion compensation unit 124 for the PU or the prediction data generated by intra prediction unit 126 for the PU. In some examples, prediction unit 100 selects the prediction data for the PU based on rate/distortion metrics of the sets of prediction data.

If prediction unit 100 selects prediction data generated by intra prediction unit 126, prediction unit 100 may signal the intra prediction mode that was used to generate the prediction data for the PUs, i.e., the selected intra prediction mode. Prediction unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction unit 100 may generate a syntax element to indicate that the selected intra prediction mode is the same as the intra prediction mode of the neighboring PU.

After prediction unit 100 selects the prediction data for PUs of a CU, residual generation unit 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform unit 104 may generate one or more transform coefficient blocks for each TU of a CU by applying one or more transforms to a residual video block associated with the TU. Each of the transform coefficient blocks may be a 2D matrix of transform coefficients. Transform unit 104 may apply various transforms to the residual video block associated with a TU. For example, transform unit 104 may apply a discrete cosine transform (DCT), a directional transform, or a conceptually similar transform to the residual video block associated with a TU.

After transform unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
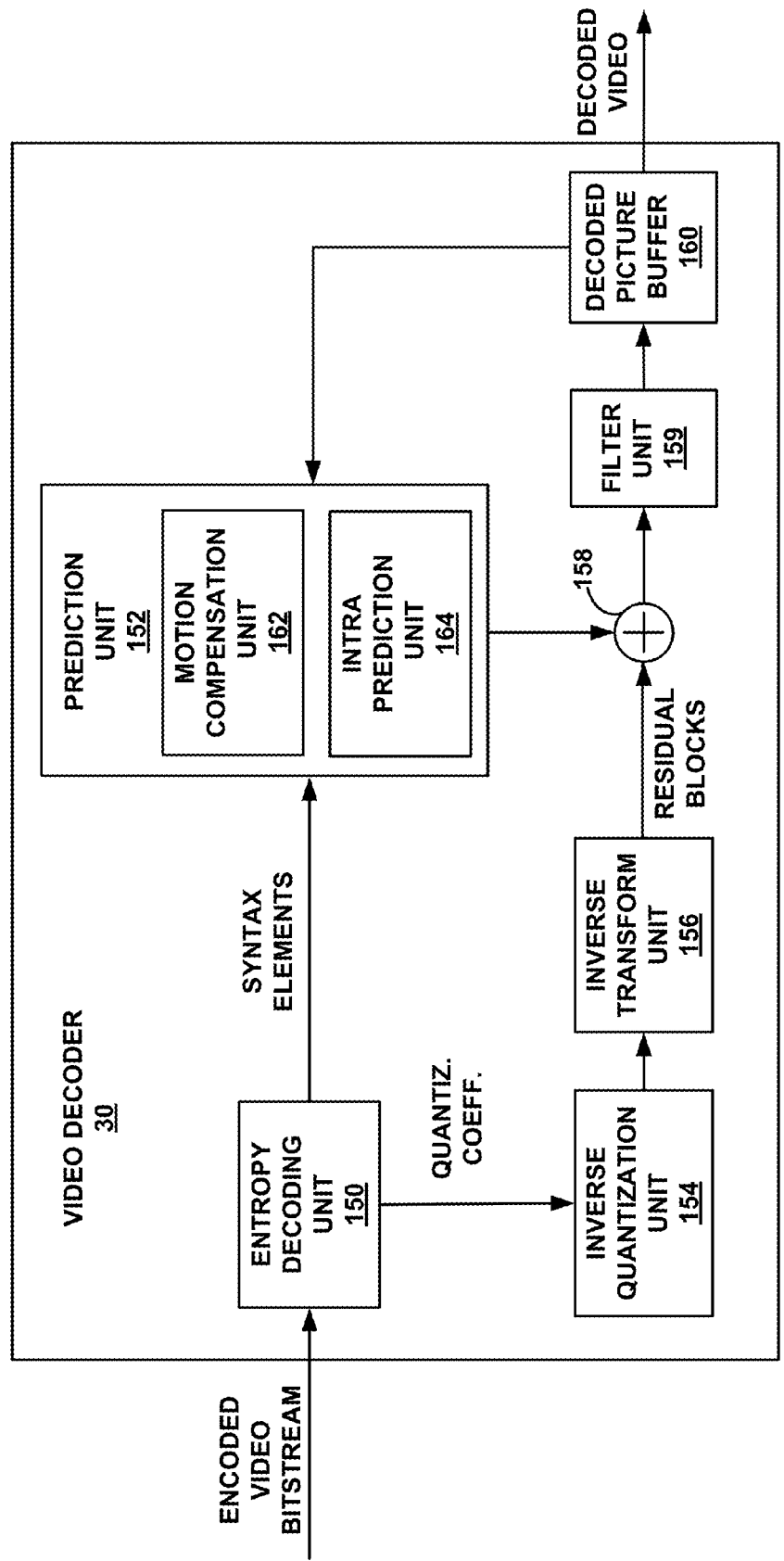
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 162 and/or intra prediction unit 164 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes a plurality of functional components. The functional components of video decoder 30 include an entropy decoding unit 150, a prediction unit 152, an inverse quantization unit 154, an inverse transform unit 156, a reconstruction unit 158, a filter unit 159, and a decoded picture buffer 160. Prediction unit 152 includes a motion compensation unit 162, and an intra prediction unit 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, i.e., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIGS. 9-12, the prediction unit 152 may code (e.g., encode or decode) the PU (or any other EL blocks or video units) by performing the steps illustrated in FIGS. 9-12.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

Reconstruction unit 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Scalable Video Coding (SVC)

As discussed above, the scalable video coding extension (SVC) of HEVC allows video information to be provided in layers. Each layer can provide video information corresponding to a different scalability. In HEVC, scalabilities are enabled in three dimensions: temporal (or time) scalability, spatial scalability, and quality scalability (sometimes referred to as signal-to-noise ratio or SNR scalability). For example, in the time dimension, frame rates with 7.5 Hz, 15 Hz, 30 Hz and etc. can be supported by temporal scalability (T). When spatial scalability (S) is supported, different resolutions such as QCIF, CIF, 4CIF and etc. may be enabled. For each specific spatial resolution and frame rate, the SNR (Q) layers can be added to improve the picture quality.

Figure 4:
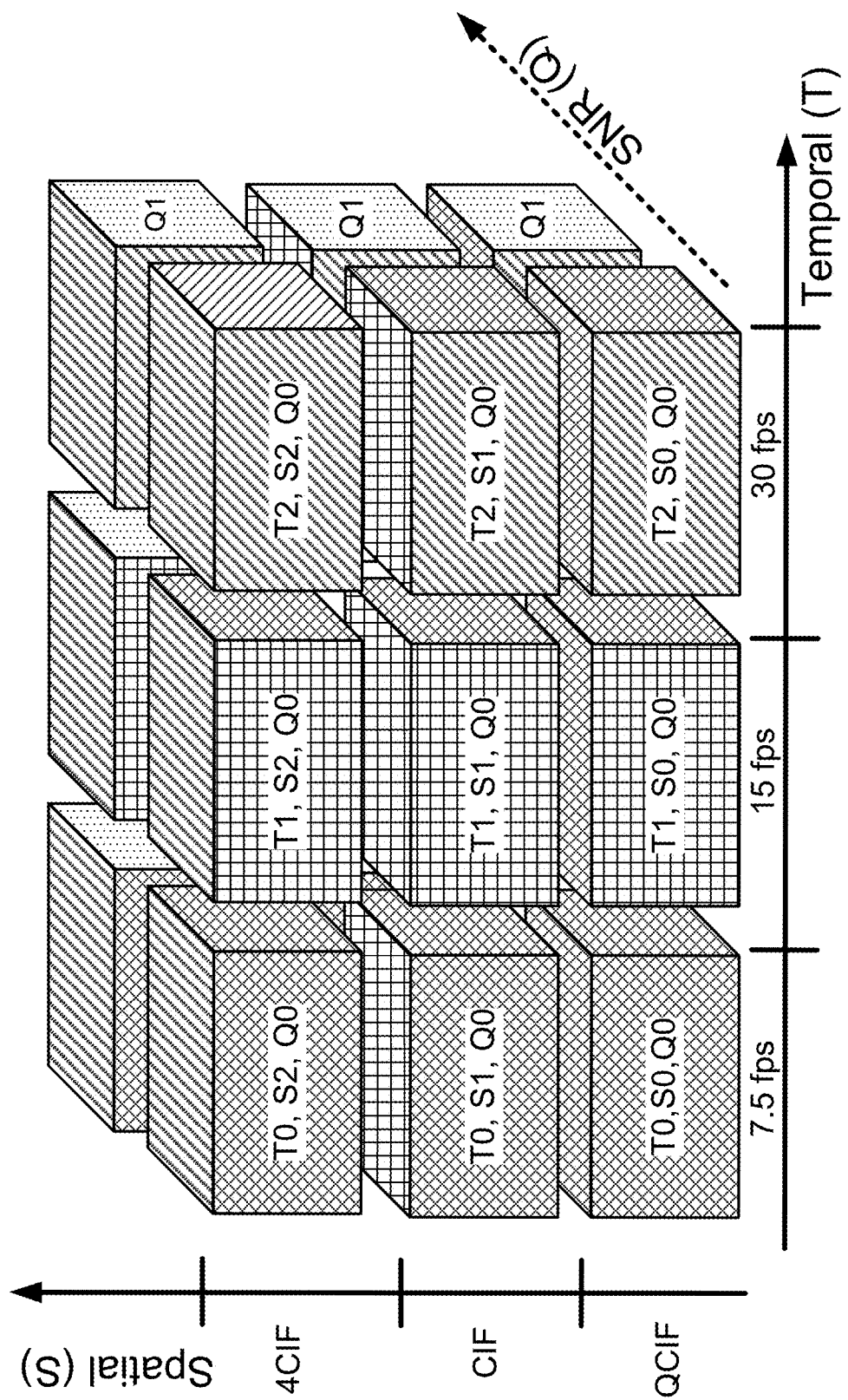
FIG. 4 is a conceptual diagram illustrating SVC scalabilities in three dimensions.

Once video content has been encoded in such a scalable way, an extractor tool may be used to adapt the actual delivered content according to application requirements, which can depend, for example, on the clients or the transmission channel. In the example shown in FIG. 4, each cubic contains the pictures with the same frame rate (temporal level), spatial resolution and SNR layers. Better representation can be achieved by adding those cubes (pictures) in any dimension. Combined scalability is supported when there are two, three or even more scalabilities enabled.

According to the SVC specification, the pictures with the lowest spatial and quality layer are compatible with H.264/AVC, and the pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred as quality scalability. Each spatial or SNR enhancement layer itself may be temporally scalable, with the same temporal scalability structure as the H.264/AVC compatible layer. For one spatial or SNR enhancement layer, the lower layer it depends on is also referred as the base layer of that specific spatial or SNR enhancement layer.

Figure 5:
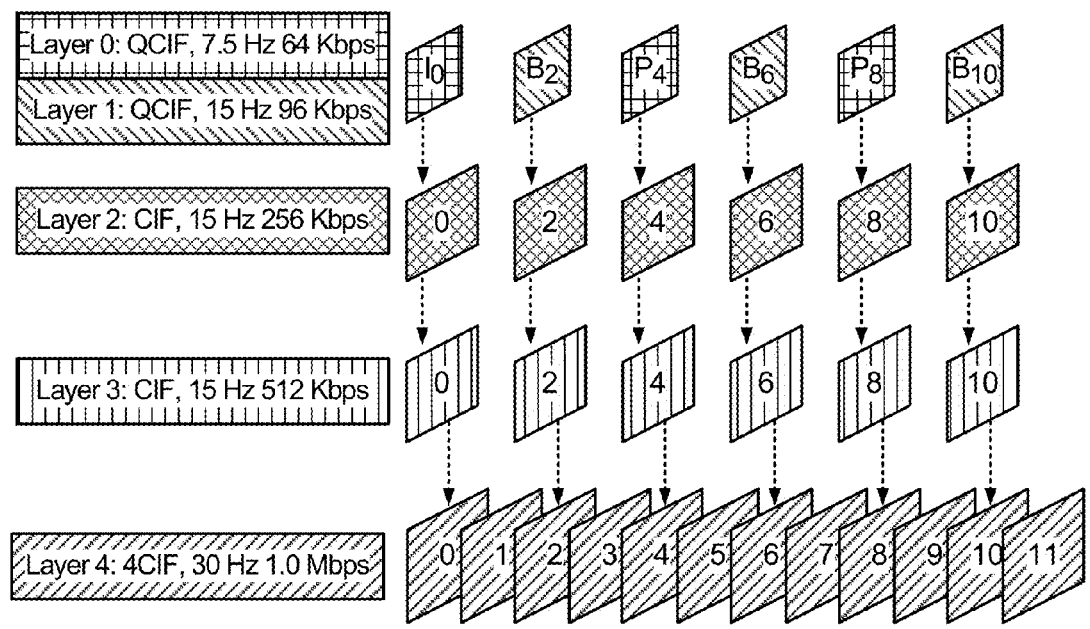
FIG. 5 is a conceptual diagram illustrating an example structure of an SVC bitstream.

An example of SVC coding structure is shown in FIG. 5. The pictures with the lowest spatial and quality layer (pictures in layer 0 and layer 1, with QCIF resolution) are compatible with H.264/AVC. Among them, those pictures of the lowest temporal level form the temporal base layer, as shown in layer 0 of FIG. 5. This temporal base layer (layer 0) can be enhanced with pictures of higher temporal levels (layer 1). In addition to the H.264/AVC compatible layer, several spatial and/or SNR enhancement layers can be added to provide spatial and/or quality scalabilities. For instance, the enhancement layer can be a CIF representation with the same resolution as layer 2. In the example, layer 3 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 provides a 4CIF enhancement layer, which further increases the frame rate from 15 Hz to 30 Hz.

Figure 6:
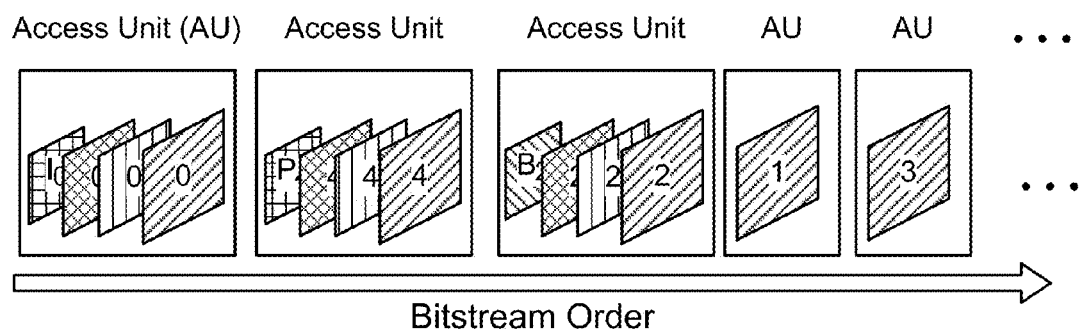
FIG. 6 is a conceptual diagram illustrating SVC access units in a bitstream.

As shown in FIG. 6, the coded slices in the same time instance are successive in the bitstream order and form one access unit in the context of SVC. Those SVC access units then follow the decoding order, which could be different from the display order and decided e.g., by the temporal prediction relationship.

Some functionalities of SVC may be inherited from H.264/AVC. Compared to previous scalable standards, many aspects of SVC, such as hierarchical temporal scalability, inter-layer prediction, single-loop decoding, and flexible transport interface, may be inherited from H.264/AVC. Each of these aspects of SVC is described in more detail below.

As described herein, an enhanced layer may have different spatial resolution than a base layer. For example, the spatial aspect ratio between the EL and the BL can be 1.0, 1.5, 2.0, or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. Accordingly, the spatial resolution of the EL can be greater than the spatial resolution of the BL.

SVC introduces inter-layer prediction for spatial and SNR scalabilities based on texture, residue and motion. Spatial scalability in SVC has been generalized to any resolution ratio between two layers (e.g., any resolution ratio between the BL and the EL). For example, one example inter-layer prediction technique involves inter-layer texture prediction. A coding mode using inter-layer texture prediction that is commonly referred to as an "IntraBL," "INTRA_BL," or "TEXTURE_BL" mode in SVC. To enable single-loop decoding, only the blocks that have co-located blocks in the BL coded as constrained intra modes can use inter-layer texture prediction mode. A constrained intra mode block refers to a block that may be intra-coded (e.g., in other words, spatially coded) without referring to any samples from the neighboring blocks that are inter-coded (e.g., in other words, temporally coded).

Another exemplary inter-layer prediction technique involves inter-layer residual prediction, where an inter-coded block in a BL is used for prediction of a co-located block in the EL. A co-located block in the EL is a block located at a position in the EL that corresponds with a position of a block in the BL. When an EL block is encoded using this inter-layer residual prediction, the co-located block in the BL for inter-layer prediction may be an inter block and its residue may be upsampled according to the spatial resolution ratio. The residue difference between the EL and that of the BL may then be coded.

Another exemplary inter-layer prediction technique involves inter-layer motion prediction. In inter-layer motion prediction, the co-located BL motion vectors may be scaled to generate predictors for the motion vectors of a block or a block partition in the EL. In addition, there may be a base mode flag signaled for the block, in which case the motion vectors, partitioning modes, and reference indices are all derived from BL, unless the corresponding BL block is intra-coded.

In deriving the motion vectors from the BL, a fixed location, such as the top left 4×4 block within the BL block, can be selected. The motion vectors at the fixed location can be used to generate the predictors for the motion vectors of the block or the block partition in the EL (e.g., the block in the EL co-located with the block in the BL). Further, one or more BL motion vectors used for EL prediction can be scaled according to the relation or ratio between the BL resolution and the EL resolution.

When motion vectors at the BL can be used to generate the predictors for the motion vectors of a current EL block, there may be several locations that can be used to derive the motion vectors at the BL. For example, when the block at the BL is larger than 4×4, there can be different motion vectors associated with each 4×4 area within the block. In some embodiments, BL motion information (e.g., a motion vector, a reference index, an inter direction, etc.) can be obtained from the top left 4×4 block; however, this location may be less optimal than other locations in some instances.

Figure 7:
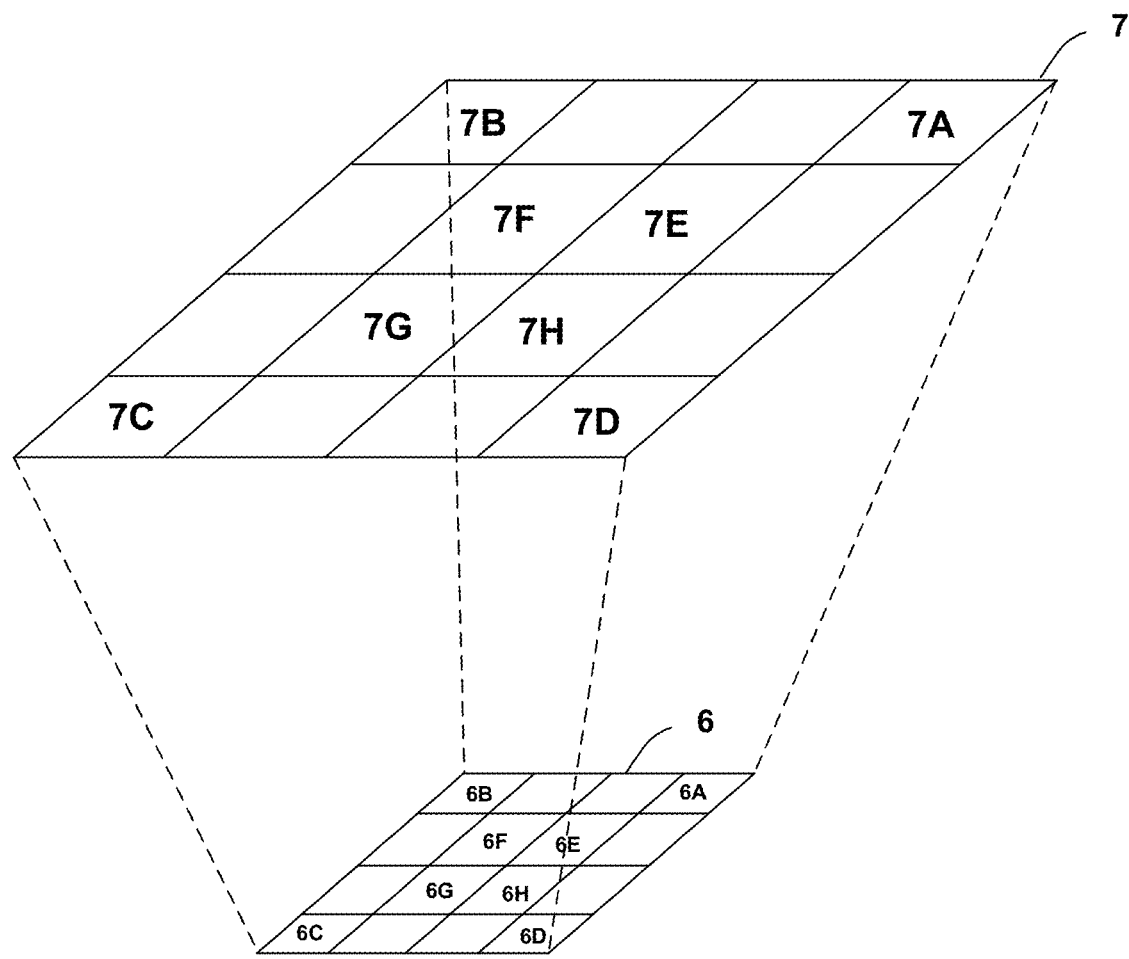
FIG. 7 is a conceptual diagram illustrating an example of blocks in multiple layers in scalable video coding (SVC).

FIG. 7 is a conceptual diagram illustrating an example of blocks in multiple layers in SVC. For example, FIG. 7 illustrates a BL block 6 and an EL block 7, which may be co-located with one another such that the BL block 6 can be located at a position in the BL corresponding to the position of the EL block 7 in the EL.

BL block 6 includes sub-blocks 6A-6H, and EL block 7 includes sub-blocks 7A-7H. Each of sub-blocks 6A-6H may be co-located with each of sub-blocks 7A-7H, respectively. For example, each of sub-blocks 6A-6H may correspond to a respective one of sub-blocks 7A-7H. In some coders, the motion information from the top left sub-block (e.g., sub-block 6B) may be used to predict the motion information for EL block 7. However, this sub-block may be less optimal than other sub-blocks in some instances. In other coders, it may be desirable to use corners in the top right (e.g., sub-block 6A), bottom left (e.g., sub-block 6C), bottom right (e.g., sub-block 6D), center (e.g., one of sub-blocks 6E, 6F, 6G, 6H), or another of the sub-blocks inside co-located BL block 6.

In some embodiments, the location of the sub-block in the corresponding BL co-located block can be fixed and/or dependent on factors such as a largest coding unit (LCU), a coding unit (CU), a prediction unit (PU), transform unit (TU) sizes, an inter direction mode, a partition mode, an amplitude of motion vector or motion vector difference, a reference index, a merge flag, a skip mode, a prediction mode, a physical location of the base and EL blocks within the pictures, and the like.

In some embodiments, the motion information can be derived jointly from two or more 4×4 sub-block locations inside the co-located BL block, using operations or functions such as an average, weighted average, median, and the like. For example, as shown in FIG. 7, five locations indicated with reference numerals 6A-6H may all be considered and the average or median value of their motion information (e.g., such as average or median values of x and y displacement values of the motion vectors) may be used as the motion information from co-located BL block in predicting EL motion information.

Coding, Prediction, and Transform Units (CU, PU, and TU)

A coding unit (CU) refers to a rectangular image region that serves as a basic unit to which various coding tools are applied for video compression. A CU may recursively split into smaller CUs. According to HEVC or HM (the reference software for HEVC), a CU can have one of the two prediction modes: Intra mode and Inter mode.

Figure 8A:
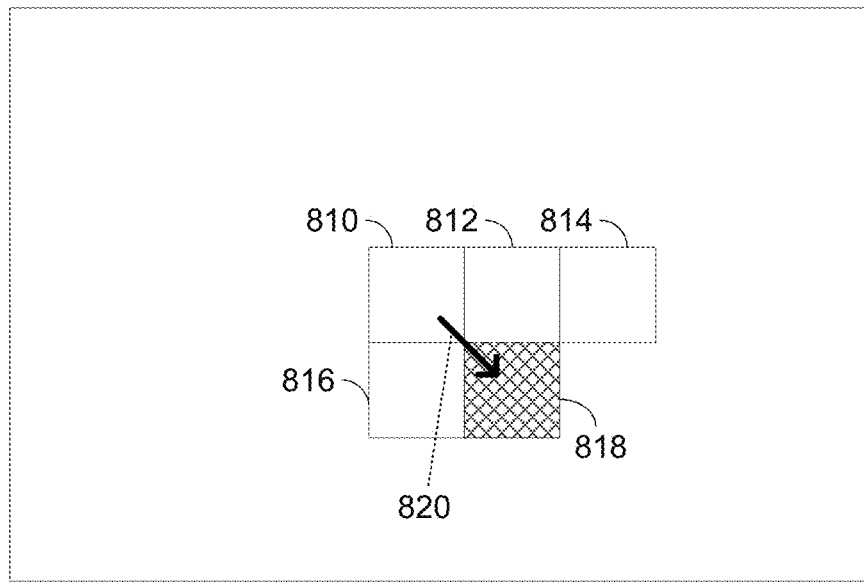
FIG. 8A is a conceptual diagram illustrating a prediction unit in an Intra coding unit predicted spatially from reconstructed neighboring pixels from the same frame or slice.

A prediction unit (PU) is the basic unit of prediction. An Intra CU of size 2N×2N can have two different prediction shapes: (1) a single 2N×2N PU; or (2) four smaller N×N PUs. A PU in the Intra CU is predicted spatially from already reconstructed neighboring pixels from the same frame or slice, as shown in FIG. 8A. FIG. 8A illustrates prediction of a block 818 based on information derived from its neighboring blocks 810-816 which have already been coded (e.g., reconstructed). Arrow 820 indicates the intra prediction direction. Multiple intra prediction directions are available for predicting the PUs, and the best direction is signaled in the bitstream. Different PUs in an Intra CU may have different prediction directions.

Figure 8B:
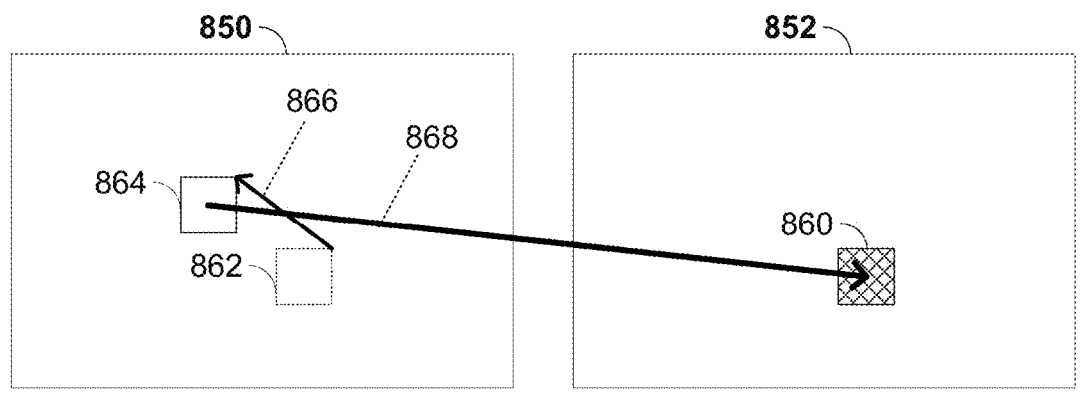
FIG. 8B is a conceptual diagram illustrating motion information identifying reference blocks.

An Inter CU of size 2N×2N can have at least the following different PU shapes: 2N×2N, N×2N, 2N×N, N×N and AMP partitions (horizontally or vertically divided into one-quarter and three-quarters). A PU in the Inter CU is predicted temporally from the best matched block or weighted blocks in an already decoded previous frame or frames (in decoded order). Such blocks are called reference block or blocks. The motion information which identifies the reference block or blocks is signaled in the bitstream. This is illustrated in FIG. 8B. FIG. 8B shows frame 850, which precedes current frame 852 in decoding order. Current frame 852 includes block 860 which is currently being predicted. Frame 850 includes block 862 which is a spatially co-located block (e.g., blocks 860 and 862 have the same coordinates within the respective frames 852 and 850) of block 860. Block 862 has a motion vector 866 which points to a reference block 864 which is located in the same frame 850. Block 860 is predicted using the information derived from the reference block 864 (e.g., indicated by arrow 868), and the motion information which identifies the reference block 864 is signaled in the bitstream. Different PUs in an Inter CU may have different motion information.

Figure 8C:
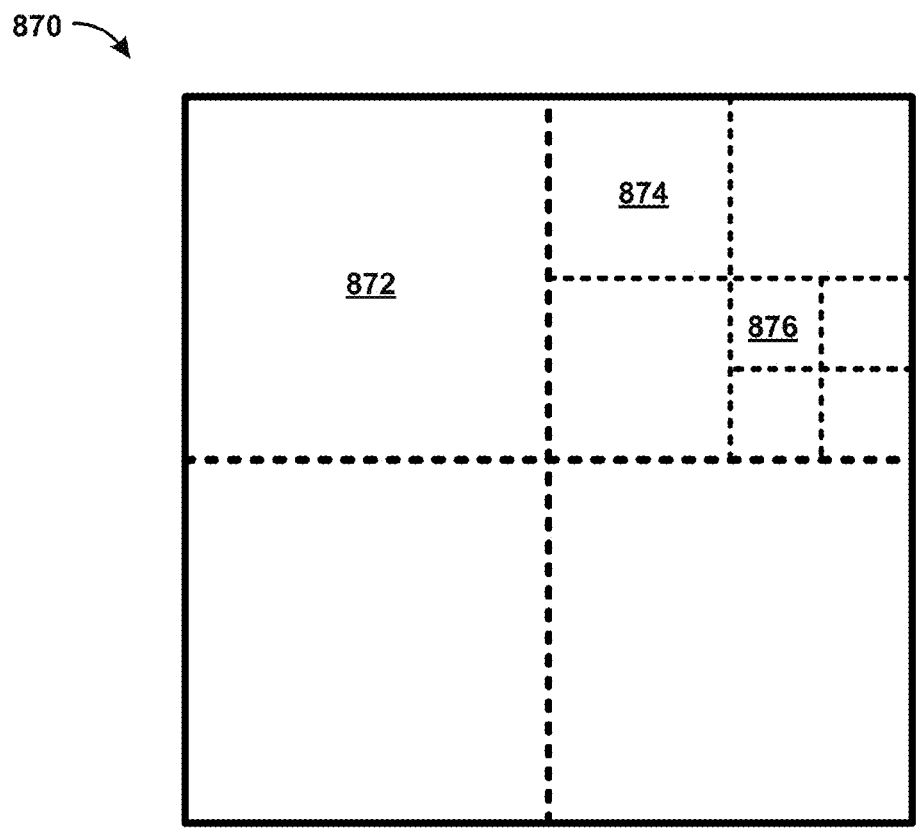
FIG. 8C is a conceptual diagram illustrating a residual quadtree (RQT) structure of a coding unit.

A transform unit (TU) is the video unit where a single transform is performed to the values in this unit. The transform is performed and signaled in a quad-tree structure called residual quad-tree (RQT). In the example of FIG. 8C, the largest block 870, having a solid line border, is the original coding unit. The internal dashed lines indicate one outcome of transform block decomposition according to quad-tree structure. Such an outcome is just one of many possible decompositions. In the example illustrated in FIG. 8C, there are three levels of transform decompositions. With level-1 (depth1) decomposition, the whole transform block is split into four quarter-sized blocks (e.g., block 872). At level-2 (depth2), the second quarter-sized transform block is further split into four $\frac{1}{16}$ sized transform blocks (e.g., block 874). At level-3 (depth3), the fourth $\frac{1}{16}$ sized transform block is further split into four even smaller transform blocks (e.g., block 876). In one embodiment, whether a transform block is to be further split or not is determined based on rate-distortion optimization. The split or no-split decision may be signaled at each level using a flag (e.g., a transform split flag).

Inferred Mode

As discussed above, in scalable video coding, video information may be provided as one absolute base layer (layer 0) and one or multiple enhancement layers (layer 1, 2, 3, etc.). Each enhancement layer may serve as a base layer for layers above it. When decoding (or encoding) layer i, lower layers (0, . . . , i–1) have already been decoded (or encoded) and all information from the lower layers may be available and used to code (decode or encode) layer i. An inferred mode (or inference mode) can be introduced in the encoding of enhancement layer information. For an enhancement layer block being coded (e.g., a coding unit in the enhancement layer) in inferred mode, a corresponding region in the base layer is found, and the block in the enhancement layer inherits all or part of the syntax element values (e.g., including motion information such as prediction direction, motion vector, reference frame index, etc.) of the corresponding region in base layer. For example, the motion information of the current EL block may be set equal to the motion information of the co-located base layer block.

This mode may be applied at coding unit (CU) level or prediction unit (PU) level. For a CU or PU coded in this mode, its motion information (which, for example, includes inter prediction direction, reference index and motion vectors) is not signaled. Instead, for each sub-block, for example, 4×4 or other sizes, in the CU/PU, its motion information is derived from its co-located base layer block. In coding instances where the motion information of a co-located base layer block is unavailable (e.g., the co-located base layer block is intra predicted), the 4×4 sub-block is predicted in the same manner as in Intra-BL mode or a motion vector can be borrowed from the neighbor blocks. Moreover, instead of a 4×4 block, other sub-block sizes can be used.

For example, for each basic unit A in the enhancement layer CU, a corresponding location B in the base layer picture is located. The motion information (e.g., prediction direction, motion vector, reference frame index, etc.) at corresponding location B is retrieved as the motion information of basic unit A. Therefore, the motion information of the enhancement layer CU does not need to be transmitted. If the enhancement layer and the base layer pictures have different sizes, the motion information from corresponding location B may be scaled before the motion information is retrieved therefrom for basic unit A.

In one embodiment, a flag at CU/PU level can be used to indicate the usage of the inferred mode. Alternatively, in another embodiment, inferred mode can be embedded in a merge mode as provided in HEVC. For example, a specified merge index in merge mode can be used to indicate the usage of inferred mode. In deriving motion information, when the spatial resolutions of BL and EL pictures are different, it is noted that the base layer MVs are scaled according to the spatial resolution ratio between the two layers. The techniques described herein may also be applied to the similar modes other than inferred mode, where at least one motion vector from the base layer is used for coding the enhancement layer block.

Reduction of Memory Bandwidth in Inferred Mode

As discussed in connection with FIG. 1, a coder may encode data to a memory device and/or retrieve and decode data from a memory device. The greater the number of read/write accesses to such memory device that a particular encoding/decoding operation needs to perform, the greater the memory bandwidth (the rate at which data can be read from or stored to such memory device) required for performing such encoding/decoding operation. In certain cases, memory access speed may limit the performance of a video coding system (e.g., frequency of memory access is great relative to computational complexity). In such cases, lowering the memory bandwidth requirements may improve the overall coding performance of the video coding system.

For example, in HEVC, 4×4 PU is disabled in order to reduce the memory bandwidth required for motion compensation. In addition, bi-directional inter-picture prediction is not allowed for 8×4 and 8×4 Pus. Hence, bi-directional motion vectors are converted to uni-L0 motion vectors for 8×4 and 4×8 PUs in merge mode.

In some embodiments, motion field compression for base layer may be postponed and applied only after enhancement layer coding. However, this uncompressed motion field may increase the memory bandwidth by causing, for example, the processor to access a greater number of motion vectors and reference indexes. In HEVC, the motion field of the reference frame is compressed based on a 16×16 block. In other words, one identical MV is set to the entire 16×16 block.

As discussed below with reference to various embodiments according to the present disclosure, there are video coding systems that provide memory bandwidth reduction for inferred mode. These embodiments are not limited to the features described herein and also apply to multiview or 3DV extensions of HEVC and similar scalable, multiview, or 3DV coding scenarios based on any other coding framework, e.g., H.264/AVC.

For example, in one embodiment, bi-directional motion vectors are restricted for inferred mode when the CU/PU in the enhancement layer has a size smaller than a predefined threshold. In one embodiment, such restriction is implemented by converting the bi-directional motion vectors for the PU with a size equal to 8×4 or 4×8 to a uni-directional motion vector of list L0. Alternatively, the bi-directional motion vector may be converted to a uni-directional motion vector of list L1. In one embodiment, such restriction on bi-directional motion vectors of the corresponding BL block is applied to similar modes that use at least one motion vector from base layer or other layers.

In one embodiment, when a CU/PU has a size smaller than a pre-defined threshold, inferred mode can be marked as unavailable and hence not be applied. More specifically, whether inferred mode is applicable to a particular CU/PU may depend on the size of the CU/PU. For example, in one embodiment, if the PU size is 4×8 or 8×4, inferred mode is not applied; otherwise, inferred mode is applied.

In one embodiment, inferred mode may be indicated by a flag. The coding of the EL block (e.g., PU or CU) can be performed such that when the size of the EL block is larger than or equal to a certain threshold (e.g., 8×8), a flag is signaled to indicate the usage of inferred mode; otherwise, the flag is not signaled and inferred mode is not used.

In one embodiment, inferred mode may be embedded in merge mode, and the coding of the EL block is performed such that when the size of the EL block is larger than or equal to a certain threshold (e.g., 8×8), a certain merge index in merge mode is used to indicate the usage of inferred mode; otherwise, the normal merge mode is used.

In one embodiment, base layer motion field is compressed based on a block size that is different from the HEVC block size before coding the enhancement layer block. In one embodiment, instead of using non-compressed motion field or using motion field compressed based on 16×16 blocks (i.e., HEVC standard), the motion field of the base layer may be compressed based on an 8×8 block size. Such differently compressed base layer motion field may be used only for inferred mode prediction, or alternatively, used for all prediction modes that use the base layer motion field.

In one embodiment, the motion field of the base layer may further be compressed based on a 16×16 block size to conform to the HEVC standard (e.g., after coding the enhancement layer).

Figure 9:
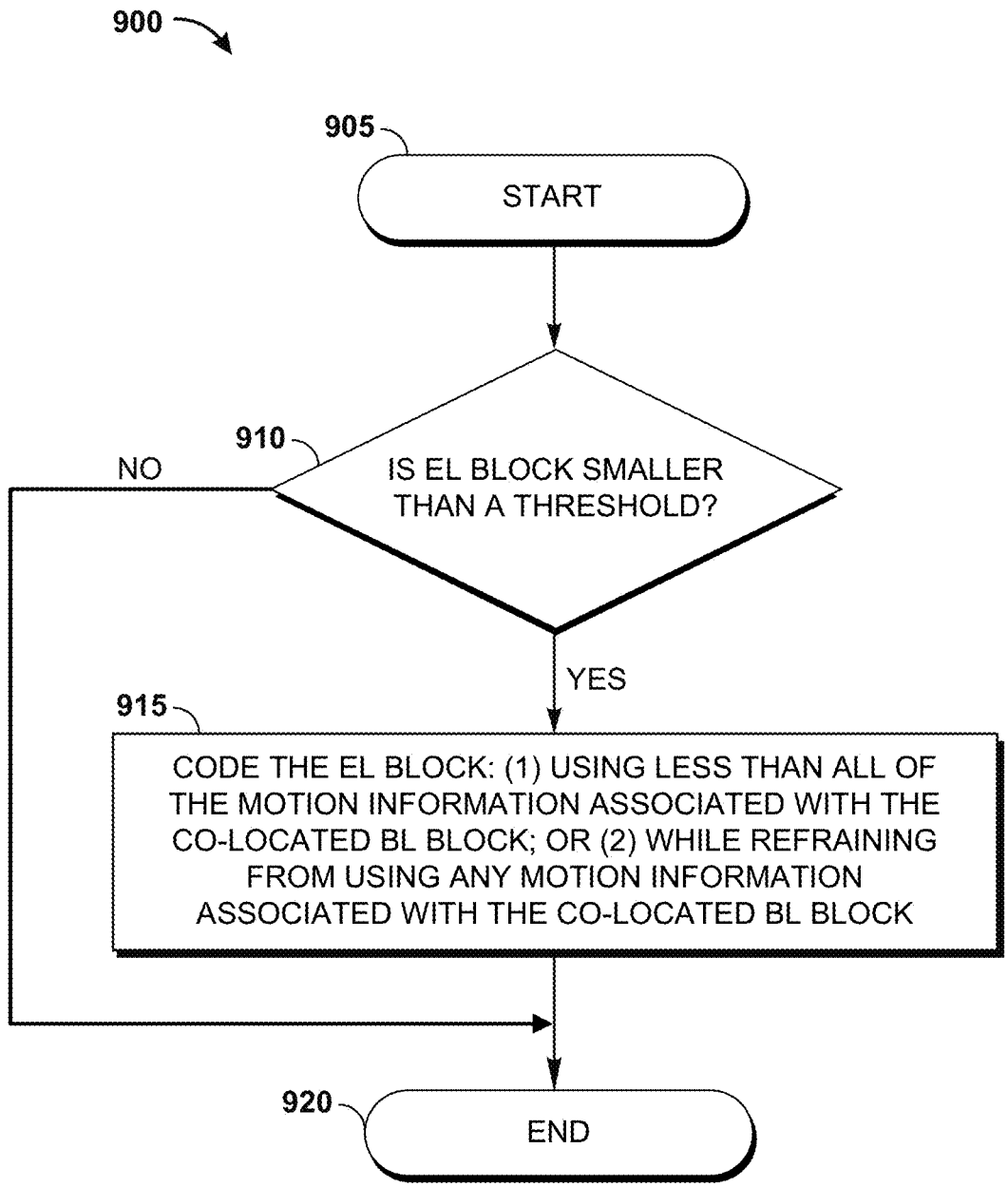
FIG. 9 is a flow chart illustrating a method of coding video information, according to one embodiment of the present disclosure.

FIG. 9 is a flowchart illustrating a method 900 for coding video information, according to an embodiment of the present disclosure. The steps illustrated in FIG. 9 may be performed by an encoder (e.g., the encoder as shown in FIG. 2), a decoder (e.g., the decoder as shown in FIG. 3), or any other component. For convenience, the steps are described as performed by a coder, which may be the encoder, the decoder or another component.

The method 900 begins at step 905. In step 910, the coder determines whether the EL block size is smaller than a threshold. The EL block discussed herein may be any block or sub-block (e.g., PU or CU) in the enhancement layer that is currently being predicted (or coded), and may be any size. For example, the threshold size may be 8×8, rendering 8×4 and 4×8 to be smaller than the threshold. If the coder determines that the EL block size is smaller than the threshold, the coder, in step 915, either (1) codes the EL block using less than all of the motion information associated with the co-located BL block, or (2) codes the EL block while refraining from using any motion information associated with the co-located BL block. For example, as discussed above, when the motion information associated with the co-located BL block includes bi-directional motion vectors, such bi-directional motion vectors may be converted to uni-directional motion vectors (e.g., such that each of the motion vectors references only from one of the lists of reference pictures list 0 and list 1) before being used for coding the EL block. In another example, the coder may refrain from signaling the mode flag indicating the inferred mode (e.g., a mode in which motion information of an EL block is inherited from its co-located BL block), causing inferred mode to be not used. The method 900 ends at step 920.

Motion Information Storage in Inferred Mode

Figure 8D:
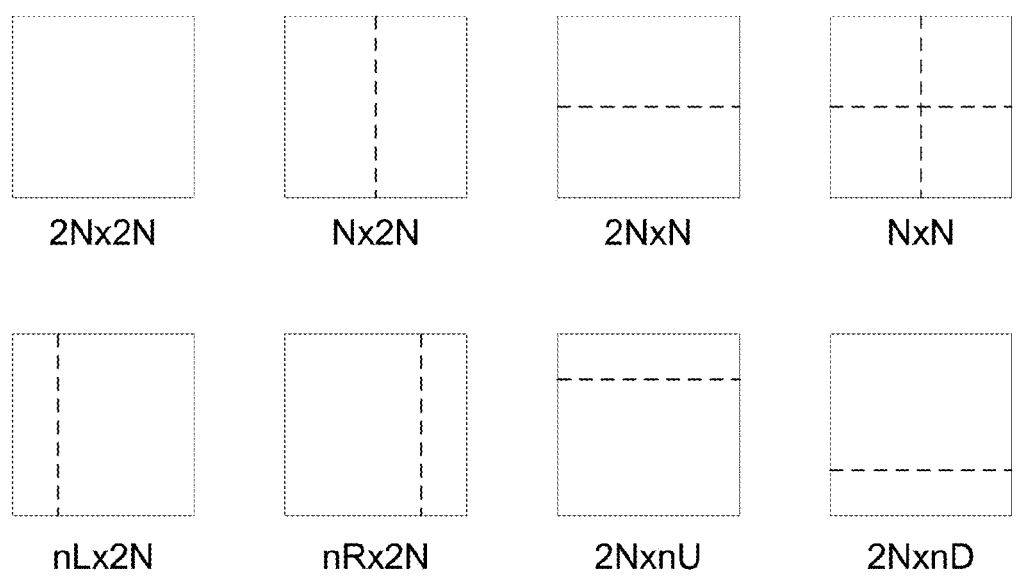
FIG. 8D is a conceptual diagram illustrating four symmetric prediction unit (PU) types and four asymmetric PU types (AMP).

The HEVC standard provides 2N×2N, N×2N, 2N×N, N×N and four AMP prediction unit (PU) partition configurations, as illustrated in FIG. 8D. In HEVC, it may be assumed that each pixel or smallest unit in a PU (e.g., the smallest unit for storing motion information can be 4×4) has the same motion information. Furthermore, motion information in any unit or pixel in a current partition can be used to predict the motion information of a future unit.

However, this assumption may not be true for a PU or coding unit (CU) encoded in inferred mode. As discussed above, in inferred mode, each basic unit can have a different motion vector, reference index, and/or prediction direction.

In one embodiment, for a CU/PU encoded in inferred mode, motion information (motion vector, prediction direction and reference index) is derived and stored for each basic unit. That is, each basic unit has its own derived motion information, and the basic units may have different motion vectors, reference indices and/or reference indices. The stored motion information can be used as a predictor for future block coding. With such a technique, the motion prediction can strictly follow the process specified in HEVC standard to avoid the ambiguity.

Figure 10:
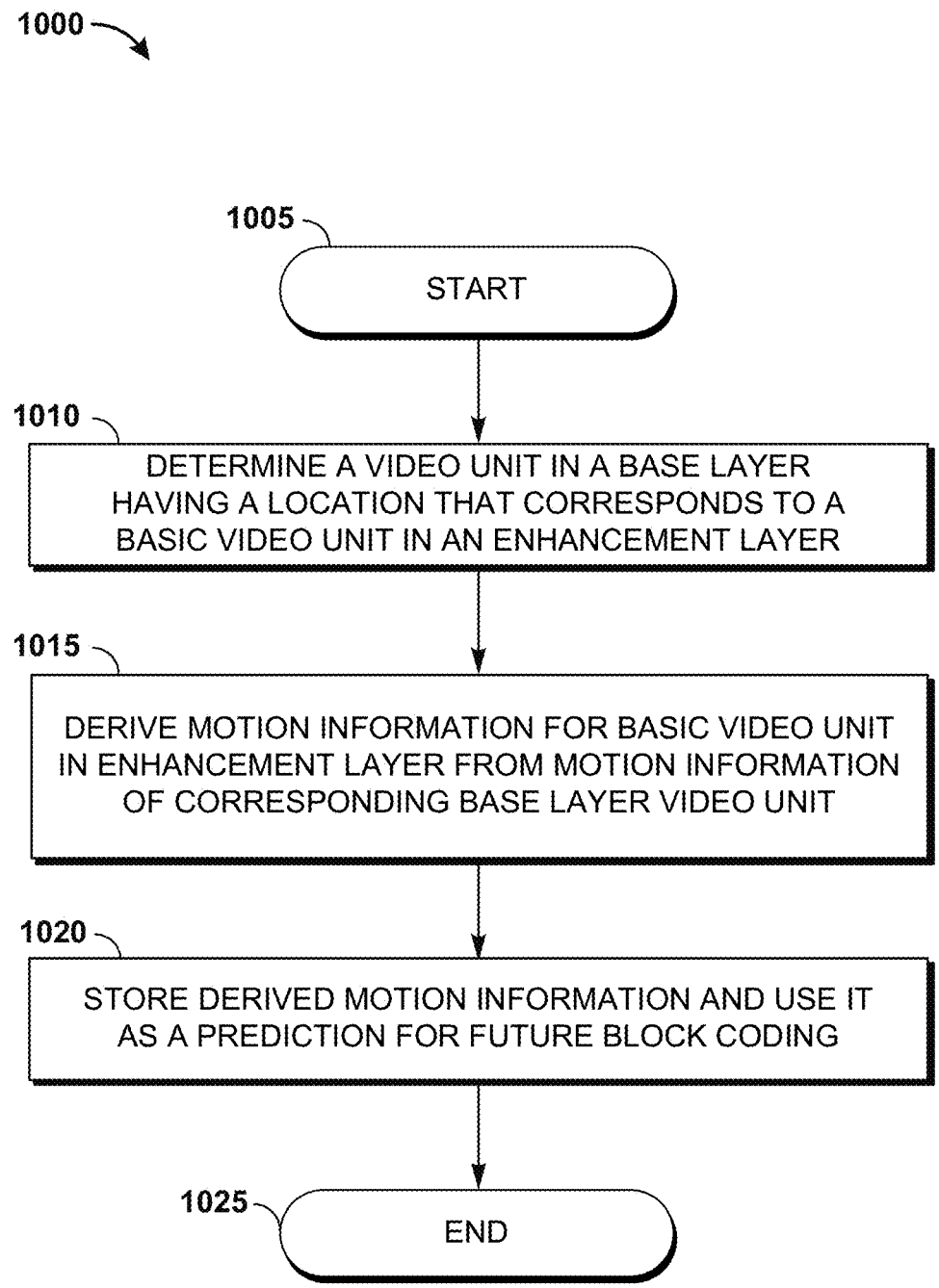
FIG. 10 is a flow chart illustrating a method of coding video information, according to one embodiment of the present disclosure.

FIG. 10 is a flowchart illustrating a method 1000 for coding video information, according to an embodiment of the present disclosure. The steps illustrated in FIG. 10 may be performed by an encoder (e.g., the encoder as shown in FIG. 2), a decoder (e.g., the decoder as shown in FIG. 3), or any other component. For convenience, the steps are described as performed by a coder, which may be the encoder, the decoder or another component.

The method 1000 begins at step 1005. In step 1010, the coder determines a video unit in a base layer having a location that corresponds to a basic video unit in an enhancement layer. For example, the BL video unit is a co-located block in the base layer. In step 1015, the coder derives motion information for the EL basic video unit from the motion information of the corresponding BL video unit. In step 1020, the coder stores the derived motion information and uses the stored motion information for coding future blocks. The method 1000 ends at step 1025.

In another embodiment, for a CU/PU encoded in inferred mode, motion information is derived as described above for each basic unit. The derived motion information is used in a motion compensation process to form a prediction with inferred mode. For example, each basic unit has its own derived motion information in the motion compensation process. After completing the prediction with inferred mode, a "typical" motion vector is assigned to all the units in the current PU/CU coded with inferred mode such that all the units in the current PU/CU have the same motion information. This may simplify the motion information prediction of future blocks. The "typical" motion vector or motion information can be the motion vector or motion information of any basic unit inside the CU or PU. For example, it can be from: the first unit (left-top) of the current CU or PU; the last unit (right-bottom) of the current CU or PU; or the center unit of the current CU or PU. In another embodiment, the typical motion vector or motion information can be the average (e.g., it may be rounded to the nearest integer values) or median of all motion information used in the current PU or CU.

In general, the selection of this typical motion vector or motion information can be pre-defined and known to both encoder and decoder. In another embodiment, it can be transmitted using high-level syntax (a flag at least in one of the headers such as slice, video parameter set (VPS), sequence parameter set (SPS), picture parameter set (PPS)). In other embodiments, it is not transmitted but is instead derived using other information, such as, for example, PU/CU size, slice type (I/P/B slice), frame size, motion field, quantization parameter (QP), temporal layer id from the current layer and/or the base layer, etc.

In yet another embodiment, for a CU encoded in inferred mode, motion information is derived as described above for each basic unit. The derived motion information is used in a motion compensation process as part of inferred mode prediction. After motion compensation, the motion information of all basic units in the current CU are analyzed according to a selected method (e.g., statistical analysis of the motion information, etc.). According to the statistics of the motion information, an appropriate partition type is assigned to the current CU. Then, the motion information derived for each basic unit may be stored as it is as discussed above, or a typical motion vector can be assigned to each PU in the current CU. The selection of the typical motion vector can occur according to any of the embodiments discussed herein. This method can also be applied to reference frame index and prediction direction.

As discussed above, the assignment of motion information for the PU or CU coded in inferred mode can affect motion information prediction of a subsequent block, since such motion information may be used in merge/AMVP modes. In yet another embodiment, motion information from the block coded with inferred block is prohibited from being used for prediction of motion information for the next or neighbor blocks. For example, during merge/AMVP candidate list construction, motion information coming from the block predicted with inferred mode can be unused or marked as unavailable.

Additionally or alternatively, motion information from the block predicted with inferred mode can be unused or marked as unavailable if a base layer motion vector is already used as a candidate in a merge/AMVP candidate list (or lists), since using more motion vectors from the base layer as candidates may degrade the performance of these modes.

In yet another embodiment, to encode motion information of a current unit A, its causal neighbor CU/PU B may be used in the prediction process. If the CU/PU B is not coded in inferred mode, then every unit/pixel in the CU/PU B has the same motion information and can be used for the prediction of the current unit A. If the CU/PU B is coded in inferred mode, then not all units will necessarily have the same motion information (e.g., some units or each unit may have a different motion).

In such case, the motion vector used to predict the current unit A can be derived from the unit that is closest to the current unit A. For example, if the CU/PU B is the left CU/PU of the current unit A, then the right-most unit of the CU/PU B can be used to predict the current unit A. It is possible that more than one unit can be equally close to the current unit A. For example, if the basic unit of motion inferring is 4×4 and the current unit A has a size of 16×16, then there are 4 units in the rightmost column of the CU/PU B that are equally close to the current unit A. In such case, the unit selected for motion vector derivation can be any one of the top, bottom, and the middle units. Similarly, if the CU/PU B is the top CU/PU of the current unit A, then the bottom unit of the CU/PU B may be used to predict the current unit A. In another embodiment, the motion vector used for prediction of the current unit A can be from the first unit in the CU/PU B, or the center unit of the CU/PU B.

In another embodiment, the motion vector used for prediction of the current unit A can be based on multiple units in the CU/PU B. For example, the motion vector can be the median value of the motion vectors in the CU/PU B, or the mean value of the motion vectors in the CU/PU B. Also, it can be a mean/median value of a subset of motion vectors in the CU/PU B. For example, if the CU/PU B is the left CU/PU of the current unit A, and there are multiple units in the CU/PU B at the boundary between the CU/PU B and the current unit A. The motion vector can be derived based on this subset of the total units in the CU/PU B.

The methods described herein may also be applied to reference frame index and prediction direction.

The selection of the unit or the subset of units in the CU/PU B can be pre-defined and known to both encoder and decoder, or it can be transmitted using high-level syntax. In another embodiment, the selection is not transmitted, but is instead derived using other information, such as CU size, slice type (I/P/B slice), frame size, motion field, quantization parameter (QP), temporal layer id from the current layer and/or the base layer, etc.

Figure 11:
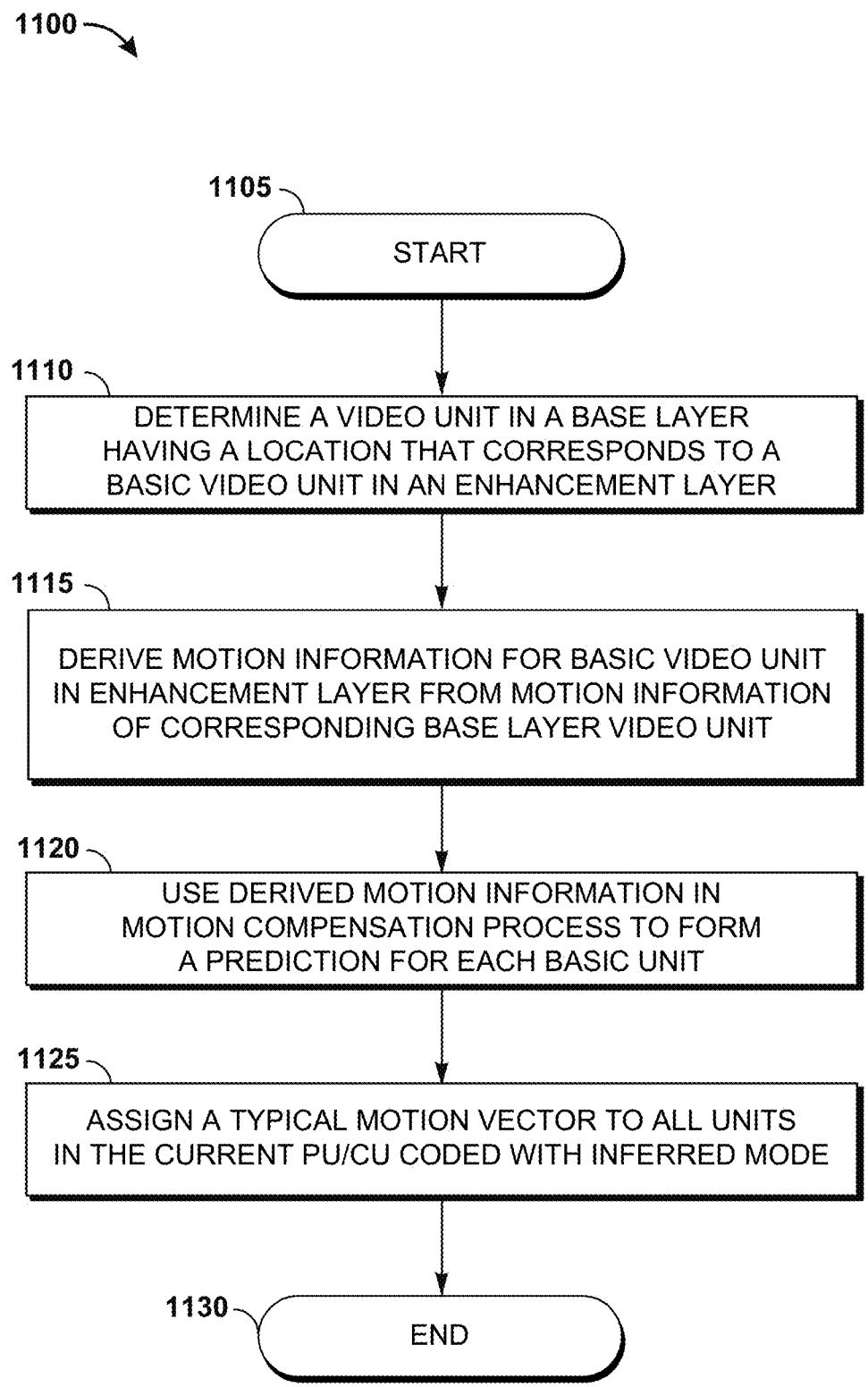
FIG. 11 is a flow chart illustrating a method of coding video information, according to one embodiment of the present disclosure.

FIG. 11 is a flowchart illustrating a method 1100 for coding video information, according to an embodiment of the present disclosure. The steps illustrated in FIG. 11 may be performed by an encoder (e.g., the encoder as shown in FIG. 2), a decoder (e.g., the decoder as shown in FIG. 3), or any other component. For convenience, the steps are described as performed by a coder, which may be the encoder, the decoder or another component.

The method 1100 begins at step 1105. In step 1110, the coder determines a video unit in a base layer having a location that corresponds to a basic video unit in an enhancement layer. For example, the BL video unit is a co-located block in the base layer. In step 1115, the coder derives motion information for the EL basic video unit from the motion information of the corresponding BL video unit. In step 1120, the coder uses the derived motion information in motion compensation process to form a prediction for each of the basic video units in the enhancement layer. In step 1125, the coder assigns a typical motion vector to all of the basic units in the current PU or CU coded with inferred mode. The method 1100 ends at step 1125.

Motion Information Derivation in Inferred Mode

As discussed above, in some cases, directly copying or otherwise utilizing the motion information from the base layer will increase the complexity of the implementation and/or reduce the overall performance of the video coding system. Also, in some embodiments, the corresponding base layer region is intra coded and does not have any motion information at all. In the embodiments described below, several techniques are described to improve the efficiency and performance of inferred mode encoding.

In one embodiment, for a basic video unit in an enhancement layer (e.g., video unit "A"), a corresponding location at base layer will be found (e.g., video unit "B"). For example, the video unit B may be referred to as a co-located base layer block of the video unit A. If the video unit B in the base layer is encoded as an intra unit (and thus there is no motion information associated with the unit B), unit A is coded using IntraBL mode. In IntraBL mode, the pixel values of unit A are predicted using reconstructed pixel values in the co-located region in the base layer.

In another embodiment, if unit B is intra coded, the motion information of A is derived using the motion information of its neighboring units in the enhancement layer (or the neighboring units in both the enhancement and base layers). For example, the motion information of unit A can be the same as its neighboring left unit. In another example, the motion information of unit A can be from its neighboring top unit. In yet another example, if the left neighboring unit has motion information, A will use the left unit's motion information; otherwise, the motion information from the top unit will be used (or vice versa, such that the top unit has priority over the left unit). In yet another embodiment, unit A is set to be a uni-predicted block with a zero motion vector (0,0) pointing to a reference frame with reference index 0. The reference frame can also be the one with other pre-defined index, or it can be specified using high-level syntax. Even if the frame allows bi-prediction, unit A is set to be a uni-predicted block with zero motion vector (0,0) pointing to a reference frame in LIST_X, where LIST_X can be List_0 or List_1. The selection of List_0 and List_1 can be pre-defined, or it can be specified using high-level syntax. In another embodiment, unit A is set to be a bi-predicted block with zero motion vectors (e.g., if the frame allows bi-prediction).

In another embodiment, the motion information of unit A is derived based on a function of motion information from multiple neighboring video units. For example, let C and D be the top and the left neighboring units, respectively. The reference frame index of unit A can be the smallest one of the reference frame indices of C and D, the largest one of the reference frame indices of C and D, the median of the reference frame indices of C and D, or the mean (e.g., possibly rounded to an integer value) of the reference frame indices of C and D. The motion vector of unit A can be set to the average of the motion vectors of C and D (e.g., the motion vectors of C or D may be scaled if the corresponding reference frame is not the same size as the selected reference frame for unit A). These are only non-limiting examples, for example, there can be more neighboring units involved in this process, such as the top-left unit, the top-right unit, the bottom-left unit, etc.

In some embodiments, there may be multiple adjacent left and/or top video units. For example, if the basic unit size is 4×4 and the current unit size is 16×16, then there are 4 left units and 4 top units. In such case, C or D can be the first one, or they can be another one chosen from the 4 units. Generally, the selection of neighboring units described above can be pre-defined and known to both the encoder and the decoder, or it can be transmitted using high-level syntax. In another embodiment, it is not transmitted but is instead derived using other information, such as CU size, frame type (e.g., I/P/B frame), frame size, motion field, quantization parameter (QP), temporal layer id from the current layer and/or the base layer.

In the embodiments discussed above, the derivation of motion information of unit A in the case that the co-located base layer unit B is intra coded is described. In one embodiment, unit A is coded using motion compensation based the derived motion information. In another embodiment, unit A is coded using IntraBL prediction while the derived motion information is used for the motion information prediction of the future block coding. This selection can be pre-defined and known to both encoder and decoder, or it can be transmitted using high-level syntax. In another embodiment, it does not need to be transmitted but can be derived using side information, such as CU size, TU size, motion field, frame type, frame size, quantization parameter (QP), temporal layer id from the current layer and/or the base layer.

As described above, in inferred mode, for every basic unit, motion information may be derived from a corresponding location or a neighboring unit in the same layer. This may potentially increase memory bandwidth (for example, when basic unit is very small (e.g., 4×4, etc.) and each basic unit has a different motion vector from its neighbors). In order to reduce the worst case memory bandwidth, the basic unit size can be set to a larger value, such as 8×8, etc.

In another embodiment, to reduce memory bandwidth, when borrowing motion information from the base layer or a neighboring unit in the same layer, the motion vectors are quantized. For example, if the default motion vector resolution is quarter-pel, it can be quantized to half-pel or to integer pel. In another embodiment, to reduce memory bandwidth, when borrowing motion information from the base layer or a neighboring unit in the same layer, bi-directional prediction can be converted to uni-directional prediction and thus motion compensation is used only one time for the enhancement layer basic unit. For example, if unit B is intra-coded, unit A can borrow the motion information from a neighboring unit C, where C is the immediately previous unit in Z-scan order. If C is a bi-predicted unit, its motion information is first converted to uni-directional prediction and then assigned to unit A.

The choice of the basic unit size and/or the quantization (decision and quantization step size) of motion vector resolution and/or conversion from bi-directional prediction to uni-directional prediction can be pre-defined and known to both encoder and decoder, or it can be transmitted using high-level syntax. In another embodiment, it is not transmitted, but instead is derived using side information, such as CU size, motion field, frame type, frame size, quantization parameter (QP), temporal layer id from the current layer and/or the base layer.

In yet another embodiment, there are two different basic unit sizes: one for bi-directional prediction and the other for uni-directional prediction. For example, 8×8 may be the unit size for bi-directional prediction, and 8×4 (or 4×8) may be the basic unit size for uni-directional prediction. In other words, bi-directional prediction will be used only for blocks having a size of 8×8 or bigger, whereas uni-directional prediction is allowed for unit sizes 4×8, 8×4 or bigger. These sizes (8×8, 4×8 and 8×4) are only example values for demonstration and it should be well understood that other values can be used. For each 8×8 unit in the enhancement layer, a method would first check if bi-predicted motion information is available from the base layer. For example, the bi-directional motion vector can be from the left-top or center pixel in corresponding region in the base layer. In another example, there are multiple, different bi-directional motion vectors in the corresponding region, and the bi-directional motion vector can be derived based on these multiple bi-directional motion vectors. The method can be as the same as described above. For example, if such bi-predicted motion information is available, bi-prediction for the 8×8 unit may be performed. Otherwise, uni-prediction may be performed with uni-prediction basic unit size (e.g., 8×4 or 4×8).

The selection of 8×4 or 4×8 can be based on analyzing motion field information in the corresponding base layer region. For example, the base layer region can be divided into two equal parts (e.g., vertical division corresponding to 4×8 and horizontal division corresponding to 8×4). The similarity of motion vectors and reference frame indices in each part is compared to calculate a similarity metric. For example, a large difference between motion vectors in a partition can indicate lower similarity. If vertical division gives a higher similarity, 4×8 is selected; otherwise, 8×4 is selected. In another embodiment, there is only one basic unit size. For example, only 8×4 is used.

The choice of basic unit sizes of uni-directional prediction and/or bi-directional prediction can be pre-defined and known to both encoder and decoder, or it can be transmitted using high-level syntax. In another embodiment, it is not transmitted but is instead derived using side information, such as CU size, motion field, frame type, frame size, quantization parameter (QP), temporal layer id from the current layer and/or the base layer.

In another embodiment, inferred mode is applied at the PU level and thus signaled for each PU.

Figure 12:
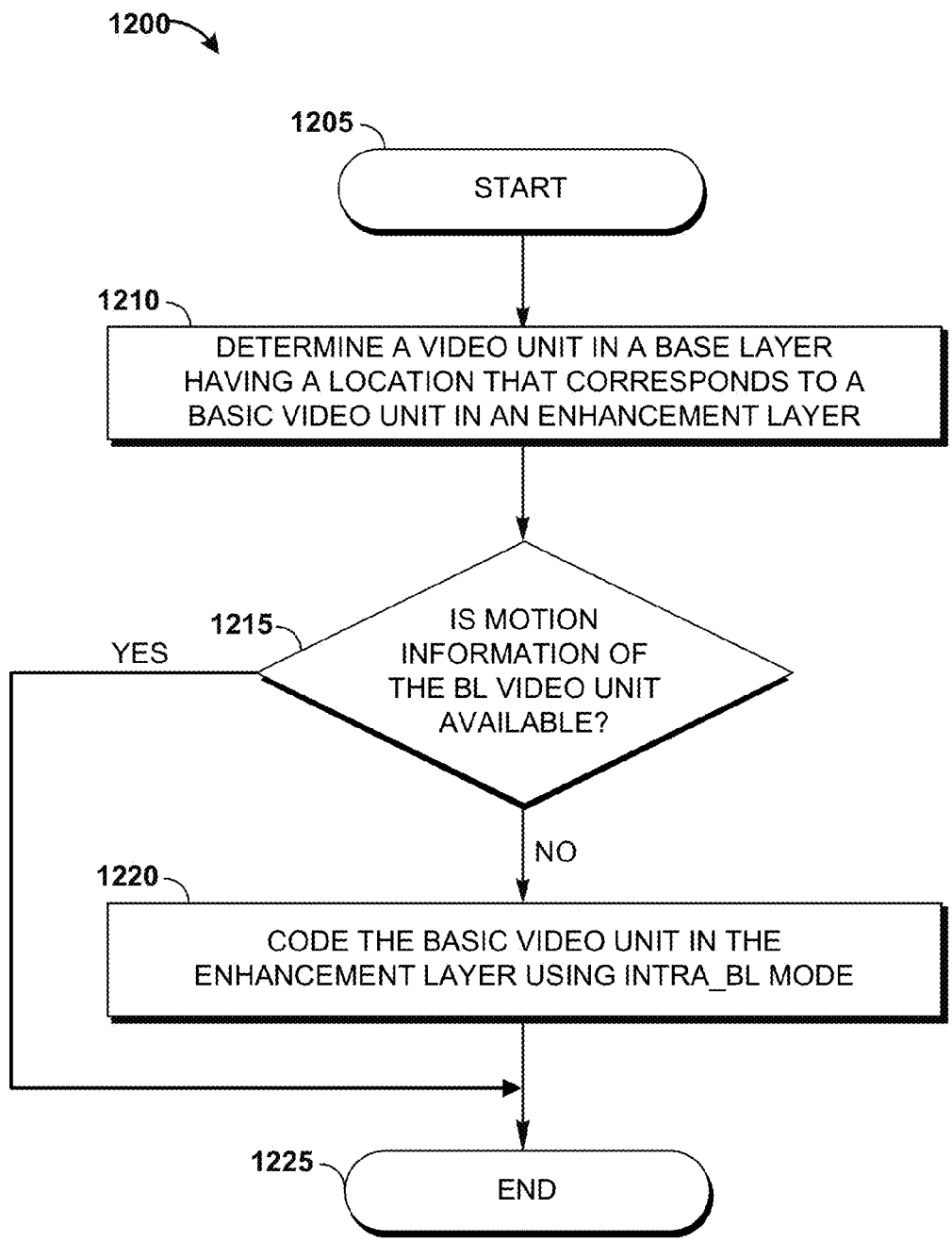
FIG. 12 is a flow chart illustrating a method of coding video information, according to one embodiment of the present disclosure

FIG. 12 is a flowchart illustrating a method 1200 for coding video information, according to an embodiment of the present disclosure. The steps illustrated in FIG. 12 may be performed by an encoder (e.g., the encoder as shown in FIG. 2), a decoder (e.g., the decoder as shown in FIG. 3), or any other component. For convenience, the steps are described as performed by a coder, which may be the encoder, the decoder or another component.

The method 1200 begins at step 1205. In step 1210, the coder determines a video unit in a base layer having a location that corresponds to a basic video unit in an enhancement layer. For example, the BL video unit is a co-located block in the base layer. In step 1215, the coder determines whether the motion information of the BL video unit is available. If it is determined that the motion information is available, step 1220 is skipped. Otherwise, in step 1220, the coder codes the basic video unit in the EL using IntraBL mode. For example, the pixel values of the basic video unit are predicted using reconstructed pixel values of the BL video unit. The method 1200 ends at step 1225.

For example, one or more components of video encoder 20 of FIG. 2 or video decoder 30 of FIG. 3 may be used to implement any of the techniques discussed in the present disclosure, such as deriving motion information, storing derived motion information, determining intra unit, coding the EL block, etc. In some embodiments, other components not shown in FIGS. 2 and 3 may be used to implement one or more of units, such as, for example, motion information derivation unit, storage unit, EL block coding unit, and etc. (not shown), for performing such techniques discussed in the present disclosure.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
a memory configured to store video data associated with a base layer (BL) and an enhancement layer (EL), the EL comprising an EL block and a co-located BL block co-located with respect to the EL block, the co-located BL block having bi-directional motion information associated therewith; and
a processor in communication with the memory, the processor configured to:
determine that a size of the EL block satisfies a threshold condition;
convert the bi-directional motion information associated with the co-located BL block to uni-directional motion information by causing one or more vectors of the bi-directional motion information to refer to one or more reference pictures from only one of reference picture list 0 and reference picture list 1; and
code the EL block using the uni-directional motion information.

2. The apparatus of claim 1, wherein the processor is further configured to:
in response to determining that the size of the EL block is one of first sizes, use less than all of the motion information associated with the co-located BL block to code the EL block; and
in response to determining that the size of the EL block is not one of the first sizes, refrain from using any motion information associated with the co-located BL block to code the EL block.

3. The apparatus of claim 1, wherein the processor is further configured to provide an indication that the EL block cannot be coded using the motion information associated with the co-located BL block.

4. The apparatus of claim 1, wherein the threshold size is 8×8.

5. The apparatus of claim 1, wherein the motion information associated with the co-located BL block comprises one or more of a motion vector, a prediction direction, and a reference index.

6. The apparatus of claim 2, wherein the processor is further configured to perform motion compensation to code the EL block using said less than all of the motion information associated with the co-located BL block.

7. The apparatus of claim 1, wherein the processor is further configured to determine a partition type of a coding unit (CU) in the enhancement layer based on the motion information of a plurality of EL blocks within the CU.

8. The apparatus of claim 1, wherein the processor is further configured to code the EL block based on one or more blocks of a neighboring coding unit (CU) or a neighboring prediction unit (PU), wherein the one or more blocks are located adjacent to the EL block.

9. A method of coding video information, the method comprising:
storing video data associated with a base layer (BL) and an enhancement layer (EL), the EL comprising an EL block and a co-located BL block co-located with respect to the EL block, the co-located BL block having bi-directional motion information associated therewith;
determining that a size of the EL block satisfies a threshold condition;
converting the bi-directional motion information associated with the co-located BL block to uni-directional motion information by causing one or more vectors of the bi-directional motion information to refer to one or more reference pictures from only one of reference picture list 0 and reference picture list 1; and
coding the EL block using the uni-directional motion information.

10. The method of claim 9, further comprising, in response to determining that the size of the EL block is one of first sizes, using less than all of the motion information associated with the co-located BL block to code the EL block.

11. The method of claim 9, further comprising providing an indication that the EL block cannot be coded using the motion information associated with the co-located BL block.

12. The method of claim 9, wherein the threshold size is 8×8.

13. The method of claim 9, wherein the motion information associated with the co-located BL block comprises one or more of a motion vector, a prediction direction, and a reference index.

14. The method of claim 10, wherein motion compensation is performed to code the EL block using said less than all of the motion information associated with the co-located BL block.

15. The method of claim 9, further comprising determining a partition type of a coding unit (CU) in the enhancement layer based on the motion information of a plurality of EL blocks within the CU.

16. The method of claim 9, wherein the EL block is coded based on one or more blocks of a neighboring coding unit (CU) or a neighboring prediction unit (PU), wherein the one or more blocks are located adjacent to the EL block.

17. A non-transitory computer readable medium includes code that, when executed, causes an apparatus to
store video data associated with a base layer (BL) and an enhancement layer (EL), the EL comprising an EL block and a co-located BL block co-located with respect to the EL block, the co-located BL block having bi-directional motion information associated therewith;
determine that a size of the EL block satisfies a threshold condition;
convert the bi-directional motion information associated with the co-located BL block to uni-directional motion information by causing one or more vectors of the bi-directional motion information to refer to one or more reference pictures from only one of reference picture list 0 and reference picture list 1; and
code the EL block using the uni-directional motion information.

18. The non-transitory computer readable medium of claim 17, wherein the code further causes the apparatus to provide an indication that the EL block cannot be coded using the motion information associated with the co-located BL block.

19. A video coding device configured to code video information includes:
means for storing video data associated with a base layer (BL) and an enhancement layer (EL), the EL comprising an EL block and a co-located BL block co-located with respect to the EL block, the co-located BL block having bi-directional motion information associated therewith;
means for determining that a size of the EL block satisfies a threshold condition;

means for converting the bi-directional motion information associated with the co-located BL block to uni-directional motion information by causing one or more vectors of the bi-directional motion information to refer to one or more reference pictures from only one of reference picture list 0 and reference picture list 1; and means for coding the EL block using the uni-directional motion information.

20. The video coding device of claim 19, further comprising means for providing an indication that the EL block cannot be coded using the motion information associated with the co-located BL block.

* * * * *